(12) United States Patent
Sethi et al.

(10) Patent No.: US 8,553,801 B2
(45) Date of Patent: Oct. 8, 2013

(54) SYSTEM AND METHOD FOR DYNAMIC OUTPUT BACK-OFF

(75) Inventors: Yogesh Sethi, Boyds, MD (US); Roderick Ragland, Silver Spring, MD (US); Dave Roos, Boyds, MD (US); Levent Ozturk, Gaithersburg, MD (US); Doug Ricker, Clarksburg, MD (US); Habib Estephan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 275 days.

(21) Appl. No.: 12/893,254

(22) Filed: Sep. 29, 2010

(65) Prior Publication Data
US 2011/0075772 A1     Mar. 31, 2011

Related U.S. Application Data

(60) Provisional application No. 61/247,367, filed on Sep. 30, 2009.

(51) Int. Cl.
*H04L 27/00*     (2006.01)

(52) U.S. Cl.
USPC ........ 375/295; 375/260; 455/102; 455/115.1; 332/108; 332/119; 332/151

(58) Field of Classification Search
USPC ......... 375/240, 260, 261, 295, 298, 300, 303, 375/308, 272, 273, 274, 279; 455/91, 102, 455/115.1, 115.3, 127.2; 332/108, 119, 151
See application file for complete search history.

(56) References Cited

U.S. PATENT DOCUMENTS

| | | | |
|---|---|---|---|
| 2006/0098761 A1* | 5/2006 | Leizerovich et al. | 375/303 |
| 2007/0140362 A1* | 6/2007 | Gilberton et al. | 375/260 |
| 2009/0163153 A1* | 6/2009 | Senda et al. | 455/101 |
| 2009/0279628 A1* | 11/2009 | Saitou | 375/260 |

* cited by examiner

*Primary Examiner* — Dac Ha
(74) *Attorney, Agent, or Firm* — Potomac Technology Law, LLC (57) ABSTRACT

A device is provided for use with an input signal including a first packet of a first modulation type in series with a second packet of a second modulation type. The device includes a gain adjustment portion and a gain portion. The gain adjustment portion can output a first gain adjustment signal based on the first packet or can output a second gain adjustment signal based on the second packet. The gain portion can output a first signal corresponding to the first packet and can output a second signal corresponding to the second packet. The first signal is based on the input signal and a first gain factor. The second signal is based on the input signal and a second gain factor. The first gain factor is based on the first gain adjustment signal. The second gain factor is based on the second gain adjustment signal.

5 Claims, 4 Drawing Sheets

SYSTEM AND METHOD FOR DYNAMIC OUTPUT BACK-OFF

The present application claims priority from U.S. Provisional Application No. 61/247,367 filed Sep. 30, 2009, the entire disclosure of which is incorporated herein by reference.

BACKGROUND

The present invention relates to Digital Video Broadcasting-Satellite-Second Generation (DVB-S2) standard for satellite communication systems, in particular, Adaptive Coding and Modulation(ACM) mode for DVB-S2.

ACM enables satellite service providers to manage their networks with much more flexibility by virtue of its continual adaptation to link conditions to each and every remote, resulting in improved bandwidth utilization. DVB-S2 incorporates the use of variable modulation types used to accomplish maximum benefit over a radio link. Careful link operating point selection is needed to optimize the performance of the selected modulation and maximize the throughput and performance.

DVB-S2 standard supports mainly four modulation types: Quadrature Phase Shift Keying (QPSK), 8 Phase Shift Keying (8PSK), 16 Asymmetric Phase Shift Keying (16APSK) and 32 Asymmetric Phase Shift Keying (32APSK). QPSK and 8PSK are proposed for broadcast applications, and can be used in non-linear transmitters driven near to saturation. 16PSK and 32PSK are used mainly for professional, semi-linear applications but can also be used for broadcasting under certain conditions.

In a satellite communication system, each transmitter will be processing a very large number of messages simultaneously. A transmitter may transmit a maximum signal strength when operating at a saturation output power level. However, operating at saturation will increase non-linearities in the transmitter amplifier. Any non-linearity in the transmitter amplifier may lead to intermodulation, which causes interference between the message signals by transferring modulations from one frequency range to another. One of the ways to reduce intermodulation is by using output back-off (OBO). OBO is the amount (in dB) by which the output power level of the amplifier is reduced, or "backed-off," from the saturation output power level.

Figure 1:
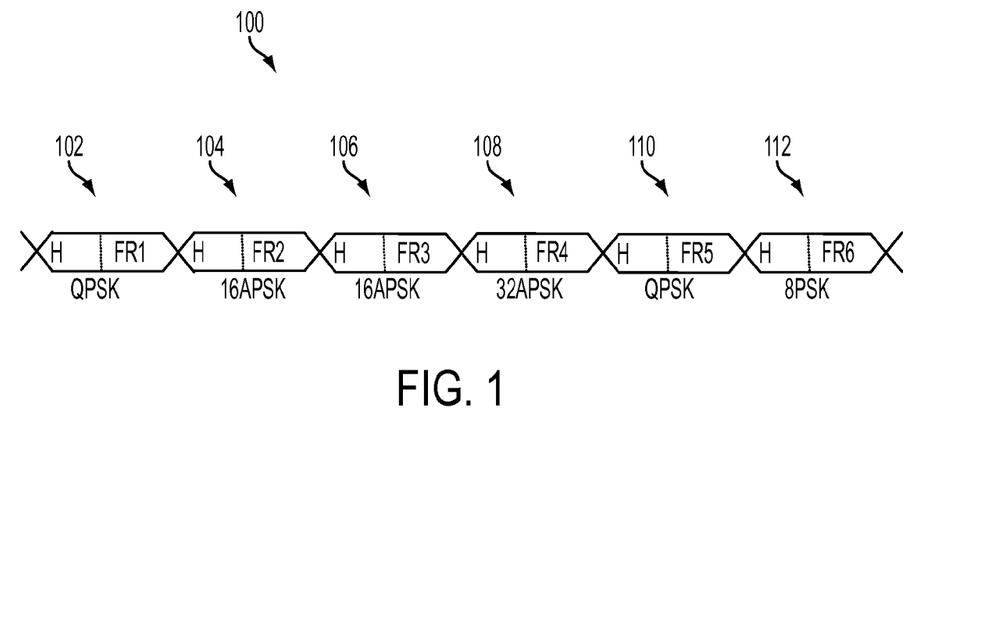
FIG. 1 illustrates a typical physical layer signal for DVB-S2 broken in to a sequence of frames.

FIG. 1 illustrates a typical physical layer signal for DVB-S2 broken in to a sequence of frames 100.

As shown in the figure, sequence 100 includes a packet 102, a packet 104, a packet 106, a packet 108, a packet 110 and a packet 112. Each packet includes a header with a frame.

The header associated with each frame may contain synchronization and signaling information. Within each frame, the coding and modulation type is homogeneous, but may change due to ACM in adjacent frames. As an example, packets 102 and 110 were created with a QPSK modulation type, packets 104 and 106 were created with a 16APSK modulation type, packet 108 was created with a 32APSK modulation type and packet 112 was created with an 8PSK modulation type. In this example, term packet is used but sequence 100 could be bursts or code blocks of data.

For any linear transmitter, it is desirable to transmit at the highest power level possible without affecting the signal. When transmitting using modulation types like QPSK and 8PSK (single ring constellations), the power level required to operate a transmitter stays the same. Relative to QPSK and 8PSK, for a transmitter to transmit with higher modulation types likes 16APSK and 32 APSK, the transmitter will require different OBO power levels. Higher modulation types have constellations with multiple power levels, where each power level is best associated with its own OBO. If a transmitter is operable to transmit packets having a plurality of different modulations modes, the transmitter must operate at the largest OBO. For example, for purposes of explanation, presume that the OBO associated with a 16APSK modulation type is larger than the OBO associated with an 8PSK modulation type. To be able to transmit packets for both the 8PSK and the 16APSK modulation types, a transmitter must reduce its overall operating level to the OBO of the 16APSK. However, in such a situation, the transmitter will not optimally transmit the packets that have been modulated with the 8PSK modulation type because the power level has been backed-off more than OBO associated with the 8PSK modulation type. In other words, to reduce the overall power for all modulation types, the power level for lower modulation types are required to be reduced as well, which may adversely affect the throughput of the transmitter.

It can be shown that QPSK and 8PSK modulation types have similar operating point back-off in the case of a satellite link or transmitter operating point in terms of OBO. But higher order modulation rates can be shown to require a higher OBO to accomplish optimum link performance due to the higher peak to average ratio of the modulation. As an example, where QPSK and 8PSK may need to operate at 0.5 dB OBO, 16APSK may need to be run another 1 dB (1.5 dB OBO) to achieve the desired link performance.

What is needed is a method to improve the throughput for higher modulation types without affecting the lower modulation types using the same transmitter in satellite communication systems.

BRIEF SUMMARY

The present invention provides a system and method to provide dynamic output back-off to improve the throughput for higher modulation types without affecting the lower modulation types using the same transmitter in satellite communication systems. For systems such as DVB-S2 ACM, where modulation type from code block to code block can be dynamically changed, optimal link performance can be achieved by dynamically changing the power level of modulation source based upon code block modulation type. Since OBO is different depending on the modulation type used, dynamically changing the power level translates into satellite transmitter operating point or dynamic OBO.

In accordance with an aspect of the present invention, a device is provided for use with an input signal including a first packet of a first modulation type in series with a second packet of a second modulation type. The device includes a gain adjustment portion and a gain portion. The gain adjustment portion can output a first gain adjustment signal based on the first packet or can output a second gain adjustment signal based on the second packet. The gain portion can output a first signal corresponding to the first packet and can output a second signal corresponding to the second packet. The first signal is based on the input signal and a first gain factor. The second signal is based on the input signal and a second gain factor. The first gain factor is based on the first gain adjustment signal. The second gain factor is based on the second gain adjustment signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

The present invention provides a system and method to provide dynamic output back-off to improve the throughput for higher modulation types without affecting the lower modulation types using the same transmitter in satellite communication systems. For systems, such as, DVB-S2 ACM, where modulation type from code block to code block can be dynamically changed, optimal link performance can be achieved by dynamically changing the power level of modulation source based upon code block modulation type. Since OBO is different depending on the modulation type used, dynamically changing the power level translates into satellite transmitter operating point or dynamic OBO.

In accordance with aspects of the invention, a power level for QPSK and 8PSK modulation types is maintained at the same level, whereas for higher modulation types, a power level is adjusted going in to the satellite to avoid saturation mode of the satellite. By using dynamic OBO, output power of a code block or a packet can be changed based on the modulation type used. For higher modulation types, there are multiple power rings to achieve higher peak to average. It is desirable to back-off just at the highest constellation without affecting the other modulation types.

A lookup table with programmable gain factor for each type of modulation achieves dynamic output back-off on a code block or burst basis. In accordance with an aspect of the present invention, the auto-gain power level of each code block is implemented in a calibration portion of the signal path.

Signals with an in-phase (I) component and a quadrature (Q) phase component may be calibrated to compensate for the imperfection of external I/Q modulators and to ensure constellation compliance. IQ calibration in accordance with aspects of the invention will be discussed further using FIGS. 2-5.

Figure 2:
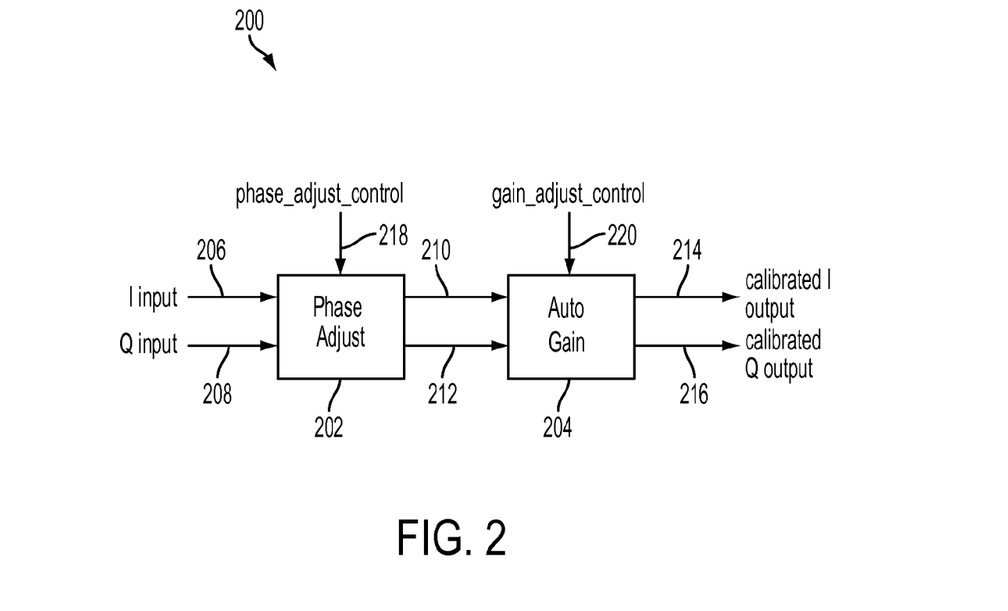
FIG. 2 illustrates an example IQ calibration module in accordance with an aspect of the invention.

FIG. 2 illustrates an example IQ calibration module 200 in accordance with an aspect of the invention.

As illustrated in the figure, IQ calibration module 200 includes a phase adjust device 202 and an auto gain adjust device 204. In one embodiment, IQ calibration module 200 is part of a modulator and interfaces with an RF (radio frequency) module (not shown).

Phase adjust device 202 is arranged to receive input signals 206 and 208 and a phase_adjust_control signal 218. As an example, input signal 206 is the in-phase portion of a signal and input signal 208 is the quadrature portion of the signal.

Auto gain adjust device 204 is arranged to receive phase-adjusted signals 210 and 212 and a gain_adjust_control signal 220. Phase-adjusted signal 210 may be the in-phase portion of a phase-adjusted signal and phase-adjusted signal 212 may be the quadrature portion of the phase-adjusted signal. An output signal 214 represents the calibrated in-phase output and an output signal 216 represents calibrated quadrature phase output.

Phase adjust device 202 operates on input signals 206 and 208 to perform phase rotation and phase compensation based on the information provided by phase_adjust_control signal 218. Phase adjustment is performed such that calibrated in-phase output signal 214 and calibrated quadrature phase output signal 216 going in to RF interface are pre-adjusted such that they are not quite 90° out of phase. This will compensate for imperfections in mixers that may be used in transmission. As such, the output signals will be 90° out of phase coming out of the modulator.

Auto gain device 204 operates on phase-adjusted signals 210 and 212 to adjust their gain based on the information provided by gain_adjust_control signal 220. In some embodiments, the gain of each of phase-adjusted signals 210 and 212 is adjusted in the same amount. In other embodiments, the gain of each of phase-adjusted signals 210 and 212 is adjusted by different amounts.

Returning to FIG. 1, each packet as shown in sequence 100 passes though IQ calibration module 200. Depending on the modulation type, and maybe dependent upon other parameters as indicated by the header associated with each frame, a calibration process adjusts the phase and gain of I and Q signals. The process is performed for every packet, thus providing dynamic output back-off on a packet basis.

As discussed with reference to FIG. 2, aspects of the invention provide a method for calibrating an input signal having an in-phase portion and a quadrature phase portion. A calibration process includes phase adjustment and gain adjustment of the input signal. Calibration is performed to pre-adjust the input signal before going in to the RF module. For a dynamically changing input signal, gain of the signal is then dynamically adjusted based on the modulation type used. Since OBO is different depending on the modulation type used, dynamically changing the power level translates into dynamic OBO. IQ calibration will now be discussed in greater detail with reference to FIGS. 3-5.

Figure 3:
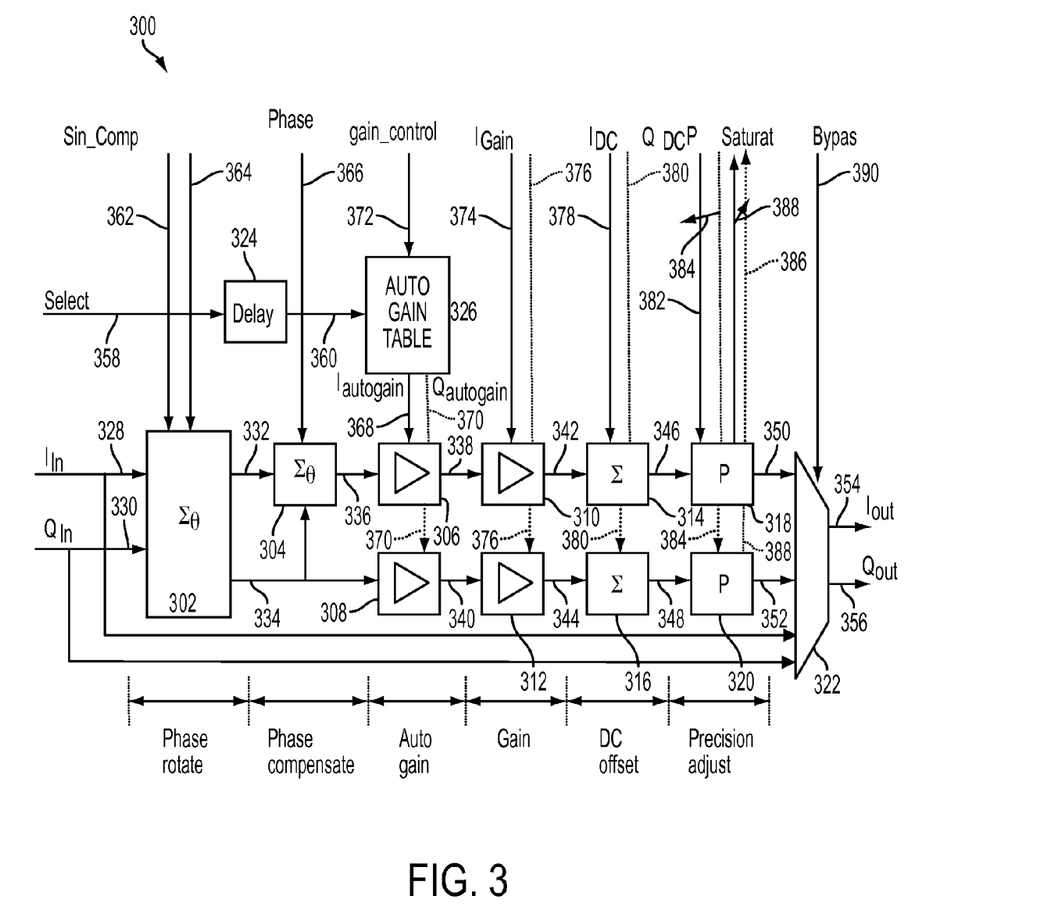
FIG. 3 illustrates an example embodiment of an IQ calibration module in accordance with an aspect of the invention.

FIG. 3 illustrates an example embodiment of IQ calibration module 300 in accordance with an aspect of the invention.

As illustrated in the figure, IQ calibration module 300 includes a phase rotation device 302, a phase compensation device 304, a gain amplifier 306, a gain amplifier 308, a gain amplifier 310, a gain amplifier 312, an adder 314, an adder 316, a precision adjust device 318, a precision adjust device 320, a multiplexer (MUX) 322, a delay unit 324 and an auto gain table 326. In this illustration, each of phase rotation device 302, phase compensation device 304, gain amplifier 306, gain amplifier 308, gain amplifier 310, gain amplifier 312, adder 314, adder 316, precision adjust device 318, precision adjust device 320, MUX 322, delay unit 324 and auto gain table 326 are illustrated as distinct devices. However, at least two of phase rotation device 302, phase compensation device 304, gain amplifier 306, gain amplifier 308, gain amplifier 310, gain amplifier 312, adder 314, adder 316, precision adjust device 318, precision adjust device 320, MUX 322, delay unit 324 and auto gain table 326 may be combined as a unitary device.

Phase rotation device 302 is arranged to receive an input signal 328, an input signal 330, a sin_comp signal 362 and a cos_comp signal 364. Input signal 328 is the in-phase portion of the signal and input signal 330 is the quadrature portion of the signal. Sin_comp signal 362 provides a compensation amount for quadrature phase signal and cos_comp signal 364 provides a compensation amount for in-phase signal. Sin_comp signal 362 and cos_comp signal 364 are used by phase rotation device 302 to rotate input signal 328 and input signal 330, respectively. Values of sin_comp signal 362 and cos_comp signal 364 may be known from a prior-calibration process.

Phase compensation device 304 is arranged to receive a phase-rotated in-phase signal 332 and a phase adjust signal 366. In other embodiments, phase compensation device 304 is arranged to receive a phase-rotated quadrature signal 334. Phase compensation device 304 further rotates phase-rotated in-phase signal 332 (or to phase-rotated quadrature signal 334 when arranged to receive phase-rotated quadrature signal 334), to ensure that phase-rotated in-phase signal 332 and phase-rotated quadrature signal 334 are not quite 90° out of phase. This will compensate for imperfections in mixers that may be used in transmission. As such, the output signals will be 90° out of phase coming out of the modulator.

Phase compensation device 304 and phase rotation device 302 together provide phase adjustment of input signals 328 and 330 based on phase adjust signal 366 such that calibrated in-phase and quadrature phase output signals going in to RF interface are pre-adjusted such that they are 90° out of phase coming out of the modulator.

Gain amplifier 306 is arranged to receive phase-adjusted in-phase signal 336 and an $I_{autogain}$ signal 368. Gain amplifier 306 amplifies phase-adjusted in-phase signal 336, which is dynamically changing based on the modulation type, by an adjustable gain based on $I_{autogain}$ signal 368. In some embodiments, the amplification provided by gain amplifier 306 may be less than 1, i.e., gain amplifier 306 provides an attenuation. Gain amplifier 306 outputs an auto gain adjusted in-phase signal 338, which is based on phase-adjusted in-phase signal 336 as adjusted by a gain amount provided in $I_{autogain}$ signal 368. In particular, the gain of gain amplifier 306 is adjusted by $I_{autogain}$ signal 368 based on the modulation type, as will be discussed in more detail below.

Gain amplifier 308 is arranged to receive phase-adjusted quadrature signal 334 and a $Q_{autogain}$ signal 370. Gain amplifier 308 operates to amplify dynamically changing phase-rotated quadrature signal 334 based on $Q_{autogain}$ signal 370. In some embodiments, the amplification provided by gain amplifier 308 may be less than 1, i.e., gain amplifier 308 provides an attenuation. Gain amplifier 308 outputs an auto gain adjusted quadrature signal 340, which is based on phase-adjusted quadrature signal 334 as adjusted by a gain amount provided in $Q_{autogain}$ signal 370. The gain of gain amplifier 308 is adjusted based on the modulation type used. $I_{autogain}$ signal 368 and $Q_{autogain}$ signal 370 may be the same or different.

Gain amplifier 310 is arranged to receive an auto gain adjusted in-phase signal 338 and an $I_{gain}$ signal 374. Gain amplifier 310 operates to amplify auto gain adjusted in-phase signal 338 based on $I_{gain}$ signal 374 to provide an amplified in-phase signal 342 such that calibrated in-phase signal going in to the DAC of the RF module is at a certain power level.

Gain amplifier 312 is arranged to receive an auto gain adjusted quadrature signal 340 and a $Q_{gain}$ signal 376. Gain amplifier 312 operates to amplify auto gain adjusted quadrature signal 340 based on $Q_{gain}$ signal 376 to provide an amplified quadrature signal 344 such that calibrated quadrature signal going in to the DAC of the RF module (not shown) is at a certain power level. $I_{gain}$ signal 374 and $Q_{gain}$ signal 376 may be the same or different.

Adder 314 is arranged to receive amplified in-phase signal 342 and an $I_{DC}$ adjust signal 378. Adder 314 outputs an offset adjusted in-phase signal 346 based on the sum of amplified in-phase signal 342 and a DC offset provided by $I_{DC}$ adjust signal 378. The DC offset compensates for the calibrated signal passing through the analog domain in the RF module (not shown).

Adder 316 is arranged to receive amplified quadrature signal 344 and a $Q_{DC}$ adjust signal 380. Adder 316 outputs an offset adjusted quadrature signal 348 based on the sum of amplified quadrature signal 344 and a DC offset provided by $Q_{DC}$ adjust signal 380. The DC offset compensates for the calibrated signal passing through the analog domain in the RF module (not shown). $I_{DC}$ adjust signal 378 and $Q_{DC}$ adjust signal 380 may be the same or different.

Precision adjust device 318 is arranged to receive offset adjusted in-phase signal 346 and an $I_{PA}$ adjust signal 382. Precision adjust device 318 adjusts the precision of offset adjusted in-phase signal 346 based on $I_{PA}$ adjust signal 382 by shifting, truncating and rounding offset adjusted in-phase signal 346. For example, precision adjust device 318 may truncate any extra bits such that the calibrated in-phase signal going into a DAC (inside RF module) has an appropriate number of bits. Precision adjust device 318 outputs an $I_{saturated}$ signal 386 indicating that signal saturation has occurred at output signal provided by precision adjust device 318. Precision adjust device 318 additionally outputs an in-phase calibrated signal 350. For purposes of discussion, suppose a DAC may only be able to convert an 8-bit digital word, whereas offset adjusted in-phase signal 346 may be a 12-bit digital word. Precision adjust device 318 may truncate the 12-bit digital word of adjusted in-phase signal 346 to an 8-bit word as in-phase calibrated signal 350. Further, Precision adjust device 318 may provide an indication that the adjusted in-phase signal 346 was shifted, truncated and/or rounded. This indication takes the form of an $I_{saturated}$ signal 386.

Precision adjust device 320 is arranged to receive offset adjusted quadrature signal 348 and a $Q_{PA}$ adjust signal 384. Precision adjust device 320 operates to adjust the precision of offset adjusted quadrature signal 348 based on $Q_{PA}$ adjust signal 384 by truncating any extra bits such that the calibrated quadrature signal going into a DAC (inside RF module) has appropriate number of bits. $I_{PA}$ adjust signal 382 and $Q_{PA}$ adjust signal 384 may be same or different. Precision adjust device 320 outputs a $Q_{saturated}$ signal 388 indicating that signal saturation has occurred at output signal provided by precision adjust device 320. Precision adjust device 320 additionally outputs a quadrature calibrated signal 352.

MUX 322 is arranged to receive in-phase calibrated signal 350, quadrature calibrated signal 352, in-phase input signal 328, quadrature input signal 330 and a bypass signal 390. Bypass signal 390 can enable MUX 322 to operate in two states. In a first state, MUX 322 outputs an in-phase output signal 354 as in-phase calibrated signal 350 and outputs a quadrature output signal 356 as quadrature calibrated signal 352. In a second state, MUX 322 outputs in-phase output signal 354 as in-phase input signal 328 and outputs quadrature output signal 356 as quadrature input signal 330.

Delay unit 324 is arranged to receive a select signal 358. Delay unit 324 delays select signal 358 by a predetermined amount. Delay unit 324 outputs the delayed select signal 358 as delayed signal 360 to auto gain table 326. This delay amount synchronizes the output of auto gain table 326 with the output of phase adjust portion of IQ calibration module 300.

Auto gain table 326 is arranged to receive delayed signal 360 and a gain control signal 372 and provides $I_{autogain}$ signal 368 and $Q_{autogain}$ signal 370. Auto gain table 326 may be a any known type of table, a non-limiting example of which includes a look-up table (LUT). Auto gain table 326 is structured to associate each of a plurality of different modulation types with a respective in-phase gain factor and quadrature gain factor. For example, if delayed signal 360 is a QPSK modulated word, then auto gain table 326 will associate the appropriate in-phase gain factor and the appropriate quadrature gain factor to be output as $I_{autogain}$ signal 368 and $Q_{autogain}$ signal 370, respectively. Similarly, if delayed signal 360 is a 32APSK modulated word, then auto gain table 326 will associate the appropriate in-phase gain factor and the appropriate quadrature gain factor to be output as $I_{autogain}$ signal 368 and $Q_{autogain}$ signal 370, respectively. Auto gain table 326 may be implemented as a memory, which is accessed using delayed signal 360 and updated using gain control signal 372.

In an example embodiment, auto gain table 326 may be a random access memory (RAM) with 256 rows, which can select an entry based on 8 bits of address provided by delayed signal 360. As an example, an address within auto gain table 326 may be made up of pilot insert, modulation type, frame size and coding rate. Gain control signal 372 may include signals to write and read auto gain table 326. Auto gain table 326 may be updated by software and/or hardware. In another example embodiment, $I_{gain}$ signal 374 and $Q_{gain}$ signal 376 may be included as part of Auto gain table 326.

As discussed above with reference to FIG. 3, IQ calibration process includes phase adjustment, gain adjustment followed by precision adjustment. With the help of auto gain table 326, dynamic OBO can be achieved based on the modulation type used. This will be described below with additional reference to FIG. 1.

In FIG. 1, sequence of frames 100 includes a plurality of frames having different modulation types, many of which have different OBO for optimal transmission. In accordance with an aspect of the present invention, an amplifier is able to provide a precise gain, associated with a respective OBO, when transmitting each of the frames within sequence of frames 100. For example, when transmitting packet 102, which is modulated with a QPSK modulation type, auto gain table 328 will adjust the gain to provide the optimal OBO for a QPSK modulation type. Then, when transmitting packet 104, which is modulated with a 16APSK modulation type, auto gain table 328 will adjust the gain to provide the optimal OBO for a 16APSK modulation type. This dynamic gain change continues as the frames are submitted for transmission. Operation of IQ calibration module 300 will now be described using a transmission of packet 102.

Initially, packet 102 may be supplied to phase rotation device 302 (as in-phase input signal 328 and quadrature input signal 330) and to delay unit 324 (as select signal 358). Delay unit 324 will provide a predetermined delay before outputting delayed signal 360. When auto gain table 326 receives delayed signal 360, auto gain table 326 will recognize the modulation type within delayed signal 360. In other words, auto gain table 326 will recognize the modulation type of packet 102. Auto gain table 326 will then determine the appropriate gain factor for each of the in-phase portion and the quadrature portion associated with the modulation type of packet 102 to minimize the OBO and therefore maximize throughput of a transmitter. The appropriate gain factors, as determined by auto gain table 326, are provided to gain amplifiers 338 and 340.

Now, returning to phase rotation device 302, the phase of each of the in-phase portion and the quadrature portion of packet 102 are rotated as needed to approach a 90° phase difference between the two portions. Phase compensation device 304 may provide an additional phase adjustment as needed. In any event, the in-phase portion and the quadrature portion of packet 102 are eventually provided to gain amplifier 306 and gain amplifier 308, respectively, as phase-adjusted in-phase signal 336 and phase-rotated quadrature signal 334. The amount of delay provided by delay unit is determined to assure that gain amplifier 306 concurrently receives $I_{autogain}$ signal 368 and phase-adjusted in-phase signal 336 and to assure that gain amplifier 308 concurrently receives $Q_{autogain}$ signal 370 and phase-rotated quadrature signal 334.

Therefore, auto gain table 326, gain amplifier 306 and gain amplifier 308 provides precise gain control to minimize OBO to maximize throughput in the face of changing modulation types. Delay 324 assures that each gain factor is supplied to the correct packet for transmission.

An IQ calibration module in accordance with aspects of the present invention, rotates the constellation, compensates for phase rotation between I and Q to assure that they are orthogonal, and adjusts gain and DC offset values of I and Q signals. Phase rotation, phase compensation, gain and DC offset values can be configured dynamically by software for both I and Q individually.

An example of phase adjustment of IQ signals will now be discussed in greater detail with reference to FIG. 4.

Figure 4:
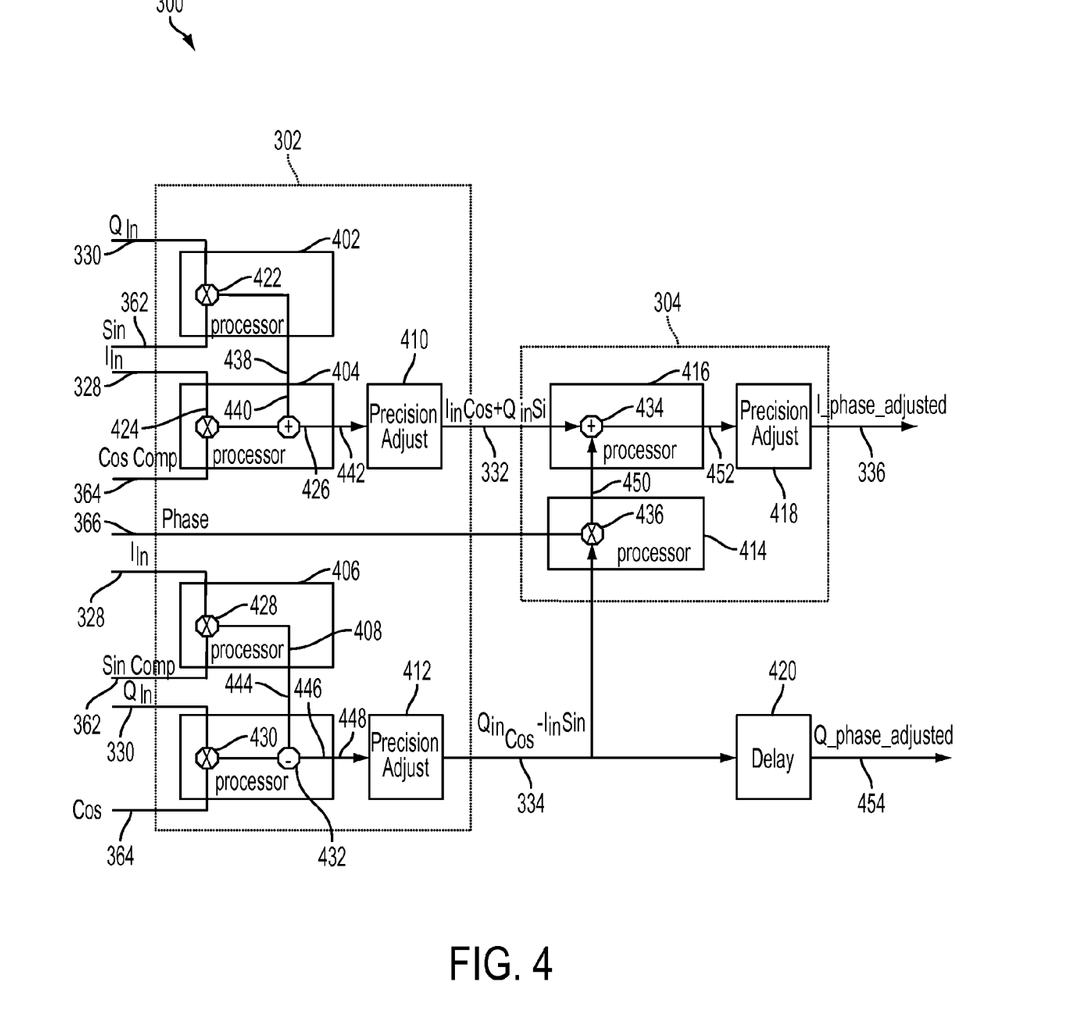
FIG. 4 illustrates an example phase adjust and rotate portion of the IQ calibration module of FIG. 3, in accordance with an aspect of the invention.

FIG. 4 illustrates an example embodiment of the phase adjust and rotate portion of IQ calibration module 300 in accordance with an aspect of the invention.

As illustrated in the figure, phase adjust and rotate portion 400 includes phase rotation device 302 and phase compensate device 304 of FIG. 3 and further includes a delay unit 420. Phase rotate device 302 includes a processor 402, a processor 404, a processor 406, a processor 408, a precision adjust device 410 and a precision adjust device 412. Phase compensate device 304 includes a processor 414, a processor 416 and a precision adjust device 418. Processor 402 includes a multiplier 422. Processor 404 includes a multiplier 424 and an adder 426. Processor 406 includes a multiplier 428. Processor 408 includes a multiplier 430 and a subtractor 432. Processor 414 includes a multiplier 436. Processor 416 includes an adder 434. In this illustration, each of processor 402, processor 404, processor 406, processor 408, processor 414, processor 416, precision adjust device 410, precision adjust device 412, precision adjust device 418 and delay unit 420 are illustrated as distinct devices. However, at least two of processor 402, processor 404, processor 406, processor 408, processor 414, processor 416, precision adjust device 410, precision adjust device 412, precision adjust device 418 and delay unit 420 may be combined as a unitary device.

Processor 402 is arranged to receive quadrature input signal 330 and sin_comp signal 362 to provide $Q_{sin\_comp}$ signal 438, which is a product of the two inputs. As an example, if quadrature input signal 330 is represented as $Q_{in}$, then $Q_{sin\_comp}$ signal 438 may be represented as:

$$Q_{sin\_comp} = Q_{in} * \sin\_comp; \quad (1)$$

Processor 404 is arranged to receive in-phase input signal 328 and cos_comp signal 364 to provide $I_{cos\_comp}$ signal 440, which is a product of the two inputs. As an example, if in-phase input signal 328 is represented as $I_{in}$, then $I_{cos\_comp}$ signal 440 may be represented as:

$$I_{cos\_comp}=I_{in}*\cos\_comp; \quad (2)$$

In an example embodiment, sin_comp signal 362 and cos_comp signal 364 are 16-bit signed values, which are sine and cosine of the θ angle that is to be subtracted from the input θ multiplied by $2^{16}$. For example, to shift the input by 10° clockwise, values of sin_comp signal 362 and cos_comp signal 364 are:

$$\cos\_comp=\cos(10)*2^{16}=64540;$$

$$\sin\_comp=\sin(10)*2^{16}=11380;$$

$Q_{sin\_comp}$ signal 438 and $I_{cos\_comp}$ signal 440 are added by adder 426 to generate an in-phase sum signal 442, which is then provided to precision adjust device 410. Precision adjust device 410 truncates the extra bits in in-phase sum signal 442. Phase-rotated in-phase signal 332 is a precision adjusted version of in-phase sum signal 442, which is represented as:

$$I_{rotate}=I_{cos\_comp}+Q_{sin\_comp}; \quad (3)$$

Alternatively, using equations (1) and (2), $$I_{rotate}=I_{in}*\cos\_comp+Q_{in}*\sin\_comp; \quad (4)$$

Processor 406 is arranged to receive in-phase input signal 328 and sin_comp signal 362 to provide $I_{sin\_comp}$ signal 444, which is a product of the two inputs. As an example, if in-phase input signal 328 is represented as $I_{in}$, then $I_{sin\_comp}$ signal 444 may be represented as:

$$I_{sin\_comp}=I_{in}*\sin\_comp; \quad (5)$$

Processor 408 is arranged to receive quadrature input signal 330 and cos_comp signal 364 to provide $Q_{cos\_comp}$ signal 446, which is a product of the two inputs. As an example, if quadrature input signal 330 is represented as $Q_{in}$, then $Q_{cos\_comp}$ signal 446 may be represented as:

$$Q_{cos\_comp}=Q_{in}*\cos\_comp; \quad (6)$$

$I_{sin\_comp}$ signal 444 and $Q_{cos\_comp}$ signal 446 are received by subtractor 432 to generate quadrature difference signal 448, which is then provided to precision adjust device 412. Precision adjust device 412 truncates any extra bits in quadrature difference signal 448. Phase-rotated quadrature signal 334 is a precision adjusted version of quadrature difference signal 448, which is represented as:

$$Q_{rotate}=Q_{cos\_comp}-I_{sin\_comp} \quad (7)$$

Alternatively, using equations (5) and (6), $$Q_{rotate}=Q_{in}*\cos\_comp-I_{in}*\sin\_comp; \quad (8)$$

Phase-rotated in-phase signal 332 and phase-rotated quadrature signal 334 are received by phase compensate device 304 to adjust the phase of phase-rotated in-phase signal 332. Phase adjust signal 366 is added to further adjust the phase of phase-rotated in-phase signal 332 to compensate for the phase error in the local oscillator of an external modulator (not shown) that generates the carrier frequency.

Processor 414 includes multiplier 436, which receives phase-rotated quadrature signal 334 and phase adjust signal 366 and provides a quadrature phase-adjusted signal 450 to processor 416. Quadrature phase-adjusted signal 450 may be represented as:

$$Q_{rotate\_phase\ adjust}=Q_{rotate}*\text{phase\_adjust}; \quad (9)$$

Processor 416 includes adder 434, which receives quadrature phase-adjusted signal 450 and phase-rotated in-phase signal 332 and provides an in-phase phase-adjusted sum signal 452. In-phase phase-adjusted sum signal 452 may be represented as:

$$I_{rotate\_phase\ adjust}=I_{rotate}+Q_{rotate\_phase\ adjust}; \quad (10)$$

Precision adjust device 418 truncates any extra bits in in-phase phase-adjusted sum signal 452 and provides phase-adjusted in-phase signal 336.

Delay unit 420 receives phase-rotated quadrature signal 334 and provides a phase-adjusted quadrature signal 454. Delay unit 420 delays by a predetermined amount phase-rotated quadrature signal 334 to compensate for the delay in phase-rotated in-phase signal 332 caused by phase compensate device 304 such that both phase-adjusted in-phase and quadrature signals are synchronized for the gain stage, which is described in detail with reference to FIG. 5.

Figure 5:
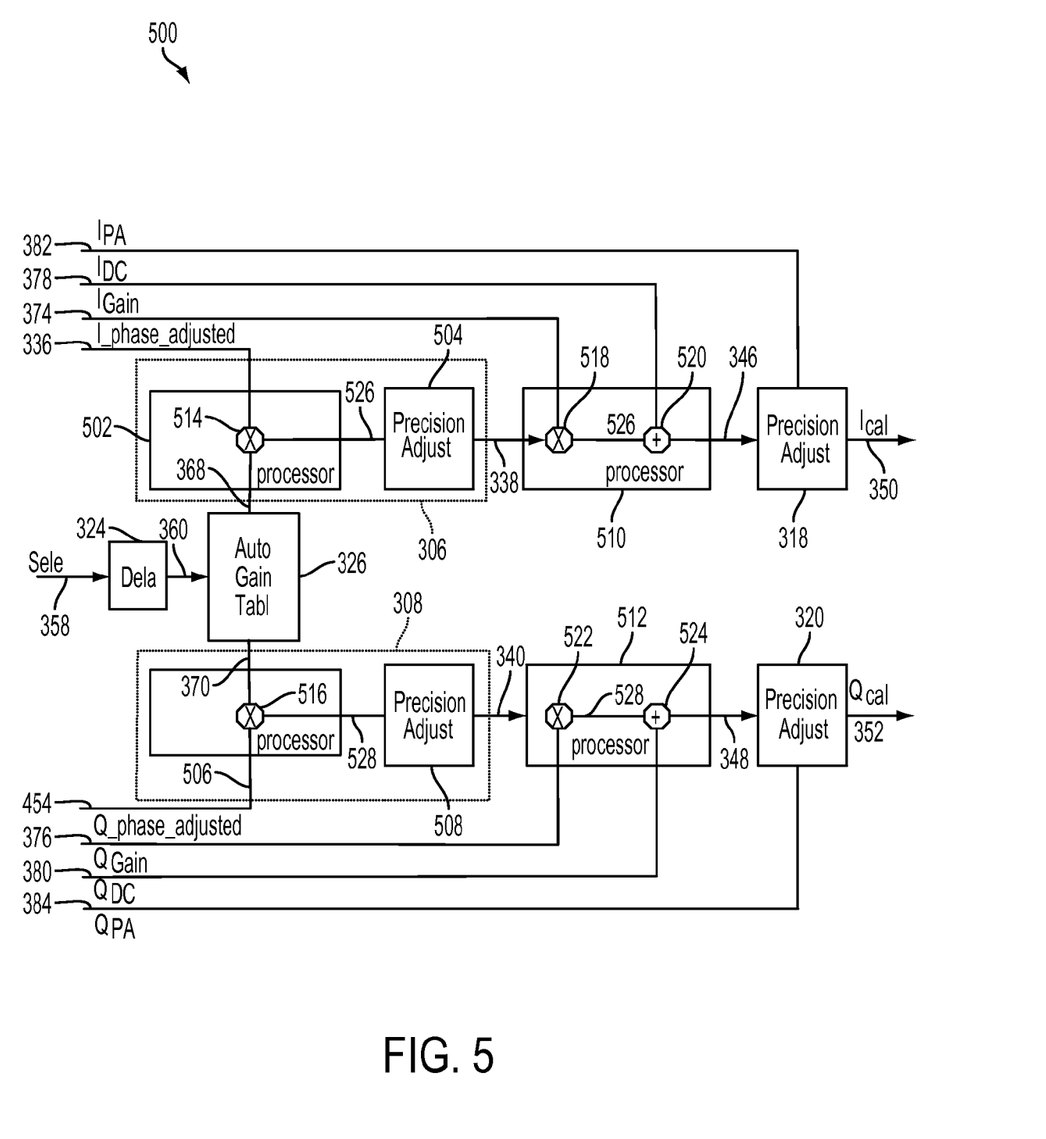
FIG. 5 illustrates an example gain portion of IQ calibration module of FIG. 3, in accordance with an aspect of the invention.

FIG. 5 illustrates an example embodiment of the gain portion of IQ calibration module 300 in accordance with an aspect of the invention.

As illustrated in the figure, gain module 500 includes auto gain table 326, gain amplifier 306, gain amplifier 308, precision adjust device 318 and precision adjust device 320. In this example embodiment, gain module 500 further includes a processor 510, which represents gain amplifier 310 and adder 314. In this example embodiment, gain module 500 also includes a processor 512, which represents gain amplifier 312 and adder 316.

As illustrated in the figure, gain amplifier 306 includes a processor 502 and a precision adjust device 504. Processor 502 further includes a multiplier 514, which receives phase-adjusted in-phase signal 336 and $I_{autogain}$ signal 368 and generates an in-phase gain adjusted product signal 526.

Precision adjust device 504 receives in-phase gain adjusted product signal 526, which has extra bits because of the multiplication process. Precision adjust device 504 truncates the unnecessary bits to generate auto gain adjusted in-phase signal 338, which may be represented as:

$$I_{auto\_gain\_phase\ adjust}=I_{autogain}*I_{rotate\_phase\ adjust}; \quad (11)$$

Processor 510 receives auto gain adjusted in-phase signal 338, $I_{DC}$ adjust signal 378 and $I_{gain}$ signal 374. Processor 510 includes a multiplier 518 and an adder 520, which correspond to amplifier 310 and adder 314 of FIG. 3. Multiplier 518 receives auto gain adjusted in-phase signal 338 and $I_{gain}$ signal 374 to generate signal 526. Signal 526 is added to $I_{DC}$ adjust signal 378 by adder 520 to generate offset adjusted in-phase signal 346.

Precision adjust device 318 receives offset adjusted in-phase signal 346 and truncates any extra bits based on $I_{PA}$ adjust signal 382. Precision adjusted in-phase signal 350 may be represented as:

$$I_{cal}=I_{gain}*I_{autogain\_phase\ adjust}+I_{DC}; \quad (12)$$

Using earlier equations, equation (12) can be expanded to:

$$I_{cal}=I_{gain}*I_{autogain}*(I_{rotate}+Q_{rotate}*\text{phase\_adjust})+I_{DC}; \quad (13)$$

Gain amplifier 308 includes a processor 506 and a precision adjust device 508. Processor 506 further includes a multiplier 516, which receives phase-adjusted quadrature signal 454 and $Q_{gain}$ signal 370 and generates a quadrature gain adjusted product signal 528.

Precision adjust 508 receives quadrature gain adjusted product signal 528, which has extra bits because of the multiplication process. Precision adjust 508 truncates the unnecessary bits to generate auto gain adjusted quadrature signal 340, which may be represented as:

$$Q_{auto\_gain\_phase\ adjust}=Q_{autogain}*Q_{rotate}; \quad (14)$$

Processor 512 receive auto gain adjusted quadrature signal 340, $Q_{DC}$ adjust signal 380 and $Q_{gain}$ signal 376. Processor 512 includes a multiplier 522 and an adder 524, which correspond to amplifier 312 and adder 316. Multiplier 522 receives auto gain adjusted quadrature 340 and $Q_{gain}$ signal 376 to generate signal 528. Signal 528 is added to $Q_{DC}$ adjust signal 380 by adder 524 to generate offset adjusted quadrature signal 348.

Precision adjust device 320 receives offset adjusted quadrature signal 348 and truncates any extra bits based on $Q_{PA}$ adjust signal 384. Precision adjusted quadrature signal 352 may be represented as:

$$Q_{cal} = Q_{gain} * Q_{autogain\_phase\ adjust} + Q_{DC}; \qquad (15)$$

Using earlier equations, equation (15) can be expanded to:

$$Q_{cal} = Q_{gain} * Q_{autogain} * Q_{rotate} + Q_{DC}; \qquad (16)$$

As discussed above with reference to FIG. 5, gain module 500 provides dynamic gain for phase-adjusted in-phase and quadrature signals using an auto gain table. Gain module 500 further adjusts gain and DC offset values of I and Q signals. Lastly, I and Q signals are precision adjusted for the RF interface (not shown).

Each processor described in FIG. 4 and FIG. 5 may include one or more central processing unit (CPU) or programmable digital signal processor (DSP) capable of executing a set of instructions. $I_{gain}$ and $Q_{gain}$ values may be provided by programmable registers, which can be modified by the software.

Aspects of the invention as discussed with reference to FIGS. 2-5 provide a method for IQ calibration to compensate for the imperfections of the external I/Q modulators and to ensure constellation compliance. The IQ calibration module rotates the constellation, compensates phase between I and Q and adjusts gain and DC offset values of I and Q signals. The rotation, compensation, gain and DC offset value can be configured dynamically by the software for both I and Q individually. With the help of a programmable auto gain table, dynamic output back-off is achieved on a code block or burst basis based upon code block modulation type. In other embodiments, dynamic output back-off may be achieved for every clock signal, wherein it is not limited to code block boundaries.

Aspects of the present invention are not limited to input signals having I/Q portions. On the contrary, in accordance with aspects of the present invention, any input signal having serial portions of data, which have been modulated with different modulation types, respectively, may be dynamically amplified (or attenuated) with an automatic gain adjustment.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
    a gain adjustment portion operable to output one of a first gain adjustment signal based on a first packet of a first modulation type and a second gain adjustment signal based on a second packet of a second modulation type;
    a gain portion operable to output a first signal corresponding to the first packet and to output a second signal corresponding to the second packet, the first signal being based on an input signal and a first gain factor, the second signal based on the input signal and a second gain factor, wherein the input signal includes an in-phase portion and a quadrature portion;
    a phase rotating portion operable to output a phase-rotated in-phase signal and a phase-rotated quadrature signal, the phase-rotated in-phase signal being based on the in-phase portion, the phase-rotated quadrature signal being based on the quadrature portion;
    a phase compensating portion operable to output one of an adjusted in-phase signal and an adjusted quadrature signal, the adjusted in-phase signal being based on the phase-rotated in-phase signal, the adjusted quadrature signal being based on the phase-adjusted quadrature signal; and
    a delay portion operable to output a delay signal to said gain adjustment portion based on the input signal,
    wherein the first gain factor is based on the first gain adjustment signal,
    wherein the second gain factor is based on the second gain adjustment signal,
    wherein the first gain factor is the same as the second gain factor,
    wherein said gain adjustment portion is operable to output the first gain adjustment signal as a first in-phase gain adjustment signal based on the first packet and a first quadrature gain adjustment signal based on the first packet,
    wherein said gain adjustment portion is operable to output the second gain adjustment signal as a second in-phase gain adjustment signal based on the second packet and a second quadrature gain adjustment signal based on the second packet,
    wherein said gain portion is operable to output the first signal as an in-phase signal corresponding to the first packet and a quadrature signal corresponding to the first packet,
    wherein said gain portion is operable to output the second signal as an in-phase signal corresponding to the second packet and a quadrature signal corresponding to the second packet,
    wherein the first gain factor includes a first in-phase gain factor and a first quadrature gain factor, the first in-phase gain factor being based on the first in-phase gain adjustment signal, the first quadrature gain factor being based on the first quadrature gain adjustment signal,
    wherein the second gain factor includes a second in-phase gain factor and a second quadrature gain factor, the second in-phase gain factor being based on the second in-phase gain adjustment signal, the second quadrature gain factor being based on the second quadrature gain adjustment signal,
    wherein the in-phase signal corresponding to the first packet is based on the in-phase portion and the first in-phase gain factor,
    wherein the quadrature signal corresponding to the first packet is based on the quadrature portion and the first quadrature gain factor,
    wherein the in-phase signal corresponding to the second packet is based on the in-phase portion and the second in-phase gain factor, wherein the quadrature signal corresponding to the second packet is based on the quadrature portion and the second quadrature gain factor, wherein the first in-phase gain factor is based on the first in-phase gain adjustment signal, wherein the first quadrature gain factor is based on the first quadrature gain adjustment signal, wherein the second in-phase gain factor is based on the second in-phase gain adjustment signal, wherein the second quadrature gain factor is based on the second quadrature gain adjustment signal, wherein said gain adjustment portion is operable to output the first gain adjustment signal, the second gain adjustment signal, the third gain adjustment signal and the fourth gain adjustment signal based on the delay signal, wherein said gain portion is operable to output the in-phase signal corresponding to the first packet based on the one of adjusted in-phase signal and phase-rotated in-phase signal, wherein said gain portion is operable to output the in-phase signal corresponding to the second packet based on the one of adjusted in-phase signal and phase-rotated in-phase signal, wherein said gain portion is operable to output the quadrature signal corresponding to the first packet based on the other of phase-rotated quadrature signal and adjusted quadrature portion, and wherein said gain portion is operable to output the quadrature signal corresponding to the second packet based on the other of phase-rotated quadrature signal and adjusted quadrature portion.

2. A device comprising:

a gain adjustment portion operable to output one of a first gain adjustment signal based on a first packet of a first modulation type and a second gain adjustment signal based on a second packet of a second modulation type;

a gain portion operable to output a first signal corresponding to the first packet and to output a second signal corresponding to the second packet, the first signal being based on an input signal and a first gain factor, the second signal based on the input signal and a second gain factor;

a phase rotating portion operable to output a phase-rotated in-phase signal and a phase-rotated quadrature signal, the phase-rotated in-phase signal being based on the in-phase portion, the phase-rotated quadrature signal being based on the quadrature portion;

a phase compensating portion operable to output one of an adjusted in-phase signal and an adjusted quadrature signal, the adjusted in-phase signal being based on the phase-rotated in-phase signal, the adjusted quadrature signal being based on the phase-adjusted quadrature signal; and a delay portion operable to output a delay signal to said gain adjustment portion based on the input signal, wherein the first gain factor is based on the first gain adjustment signal, wherein the second gain factor is based on the second gain adjustment signal, wherein the input signal includes an in-phase portion and a quadrature portion, wherein said gain adjustment portion is operable to output the first gain adjustment signal as a first in-phase gain adjustment signal based on the first packet and a first quadrature gain adjustment signal based on the first packet, wherein said gain adjustment portion is operable to output the second gain adjustment signal as a second in-phase gain adjustment signal based on the second packet and a second quadrature gain adjustment signal based on the second packet, wherein said gain portion is operable to output the first signal as an in-phase signal corresponding to the first packet and a quadrature signal corresponding to the first packet, wherein said gain portion is operable to output the second signal as an in-phase signal corresponding to the second packet and a quadrature signal corresponding to the second packet, wherein the first gain factor includes a first in-phase gain factor and a first quadrature gain factor, the first in-phase gain factor being based on the first in-phase gain adjustment signal, the first quadrature gain factor being based on the first quadrature gain adjustment signal, wherein the second gain factor includes a second in-phase gain factor and a second quadrature gain factor, the second in-phase gain factor being based on the second in-phase gain adjustment signal, the second quadrature gain factor being based on the second quadrature gain adjustment signal, wherein the in-phase signal corresponding to the first packet is based on the in-phase portion and the first in-phase gain factor, wherein the quadrature signal corresponding to the first packet is based on the quadrature portion and the first quadrature gain factor, wherein the in-phase signal corresponding to the second packet is based on the in-phase portion and the second in-phase gain factor, wherein the quadrature signal corresponding to the second packet is based on the quadrature portion and the second quadrature gain factor, wherein the first in-phase gain factor is based on the first in-phase gain adjustment signal, wherein the first quadrature gain factor is based on the first quadrature gain adjustment signal, wherein the second in-phase gain factor is based on the second in-phase gain adjustment signal, and wherein the second quadrature gain factor is based on the second quadrature gain adjustment signal, wherein said gain adjustment portion is operable to output the first gain adjustment signal, the second gain adjustment signal, the third gain adjustment signal and the fourth gain adjustment signal based on the delay signal, wherein said gain portion is operable to output the in-phase signal corresponding to the first packet based on the one of adjusted in-phase signal and phase-rotated in-phase signal, wherein said gain portion is operable to output the in-phase signal corresponding to the second packet based on the one of adjusted in-phase signal and phase-rotated in-phase signal, wherein said gain portion is operable to output the quadrature signal corresponding to the first packet based on the other of phase-rotated quadrature signal and adjusted quadrature portion, and wherein said gain portion is operable to output the quadrature signal corresponding to the second packet based on the other of phase-rotated quadrature signal and adjusted quadrature portion.

3. A method of adjusting an input signal, said method comprising:

outputting, via a gain adjustment portion, one of a first gain adjustment signal based on a first packet of a first modulation type and a second gain adjustment signal based on a second packet of a second modulation type;

outputting, via a gain portion, a first signal corresponding to the first packet, the first signal being based on an input signal and a first gain factor;

outputting, via the gain portion, a second signal corresponding to the second packet, the second signal based on the input signal and a second gain factor, wherein the input signal includes an in-phase portion and a quadrature portion;

outputting, via a phase rotating portion, a phase-rotated in-phase signal and a phase-rotated quadrature signal, the phase-rotated in-phase signal being based on the in-phase portion, the phase-rotated quadrature signal being based on the quadrature portion;

outputting, via a phase compensating portion, one of an adjusted in-phase signal and an adjusted quadrature signal, the adjusted in-phase signal being based on the phase-rotated in-phase signal, the adjusted quadrature signal being based on the phase-adjusted quadrature signal; and outputting, via a delay portion, a delay signal to the gain adjustment portion based on the input signal, wherein the first gain factor is based on the first gain adjustment signal, wherein the second gain factor is based on the second gain adjustment signal, wherein the first gain factor is the same as the second gain factor, wherein said gain adjustment portion is operable to output the first gain adjustment signal as a first in-phase gain adjustment signal based on the first packet and a first quadrature gain adjustment signal based on the first packet, wherein said gain adjustment portion is operable to output the second gain adjustment signal as a second in-phase gain adjustment signal based on the second packet and a second quadrature gain adjustment signal based on the second packet, wherein said gain portion is operable to output the first signal as an in-phase signal corresponding to the first packet and a quadrature signal corresponding to the first packet, wherein said gain portion is operable to output the second signal as an in-phase signal corresponding to the second packet and a quadrature signal corresponding to the second packet, wherein the first gain factor includes a first in-phase gain factor and a first quadrature gain factor, the first in-phase gain factor being based on the first in-phase gain adjustment signal, the first quadrature gain factor being based on the first quadrature gain adjustment signal, wherein the second gain factor includes a second in-phase gain factor and a second quadrature gain factor, the second in-phase gain factor being based on the second in-phase gain adjustment signal, the second quadrature gain factor being based on the second quadrature gain adjustment signal, wherein the in-phase signal corresponding to the first packet is based on the in-phase portion and the first in-phase gain factor, wherein the quadrature signal corresponding to the first packet is based on the quadrature portion and the first quadrature gain factor, wherein the in-phase signal corresponding to the second packet is based on the in-phase portion and the second in-phase gain factor, wherein the quadrature signal corresponding to the second packet is based on the quadrature portion and the second quadrature gain factor, wherein the first in-phase gain factor is based on the first in-phase gain adjustment signal, wherein the first quadrature gain factor is based on the first quadrature gain adjustment signal, wherein the second in-phase gain factor is based on the second in-phase gain adjustment signal, and wherein the second quadrature gain factor is based on the second quadrature gain adjustment signal, wherein said outputting the first gain adjustment signal and the second gain adjustment signal comprises outputting the first gain adjustment signal and the second gain adjustment signal based on the delay signal, wherein said outputting the third gain adjustment signal and the fourth gain adjustment signal comprises outputting the third gain adjustment signal and the fourth gain adjustment signal based on the delay signal, wherein said outputting the in-phase signal comprises outputting the in-phase signal corresponding to the first packet based on one of the adjusted in-phase signal and the phase-rotated in-phase signal, wherein said outputting the quadrature signal corresponding to the first packet comprises outputting the quadrature signal corresponding to the first packet based on the other of phase-rotated quadrature signal and adjusted quadrature portion, wherein said outputting the in-phase signal corresponding to the second packet comprises outputting the in-phase signal corresponding to the second packet based on the one of adjusted in-phase signal and phase-rotated in-phase signal, and wherein said outputting the quadrature signal corresponding to the second packet comprises outputting the quadrature signal corresponding to the second packet based on the other of phase-rotated quadrature signal and adjusted quadrature portion.

4. A method of adjusting an input signal, said method comprising:

outputting, via a gain adjustment portion, one of a first gain adjustment signal based on a first packet of a first modulation type and a second gain adjustment signal based on a second packet of a second modulation type;

outputting, via a gain portion, a first signal corresponding to the first packet, the first signal being based on an input signal and a first gain factor;

outputting, via the gain portion, a second signal corresponding to the second packet, the second signal based on the input signal and a second gain factor;

outputting, via a phase rotating portion, a phase-rotated in-phase signal and a phase-rotated quadrature signal, the phase-rotated in-phase signal being based on the in-phase portion, the phase-rotated quadrature signal being based on the quadrature portion;

outputting, via a phase compensating portion, one of an adjusted in-phase signal and an adjusted quadrature signal, the adjusted in-phase signal being based on the phase-rotated in-phase signal, the adjusted quadrature signal being based on the phase-adjusted quadrature signal; and outputting, via a delay portion, a delay signal to the gain adjustment portion based on the input signal, wherein the first gain factor is based on the first gain adjustment signal,
wherein the second gain factor is based on the second gain adjustment signal,
wherein said outputting the first gain adjustment signal and the second gain adjustment signal comprises outputting the first gain adjustment signal and the second gain adjustment signal based on the delay signal,
wherein said outputting the third gain adjustment signal and the fourth gain adjustment signal comprises outputting the third gain adjustment signal and the fourth gain adjustment signal based on the delay signal,
wherein said outputting the in-phase signal corresponding to the first packet comprises outputting the in-phase signal corresponding to the first packet based on the one of adjusted in-phase signal and phase-rotated in-phase signal,
wherein said outputting the quadrature signal corresponding to the first packet comprises outputting the quadrature signal corresponding to the first packet based on the other of phase-rotated quadrature signal and adjusted quadrature portion,
wherein said outputting the in-phase signal corresponding to the second packet comprises outputting the in-phase signal corresponding to the second packet based on the one of adjusted in-phase signal and phase-rotated in-phase signal, and
wherein said outputting the quadrature signal corresponding to the second packet comprises outputting the quadrature signal corresponding to the second packet based on the other of phase-rotated quadrature signal and adjusted quadrature portion.

5. A non-transitory computer readable storage medium carrying one or more sequences of one or more instructions which, when executed by one or more processors, cause an apparatus to at least perform the following steps:
  outputting, via a gain adjustment portion, one of a first gain adjustment signal based on a first packet of a first modulation type and a second gain adjustment signal based on a second packet of a second modulation type;
  outputting, via a gain portion, a first signal corresponding to the first packet, the first signal being based on an input signal and a first gain factor;
  outputting, via the gain portion, a second signal corresponding to the second packet, the second signal based on the input signal and a second gain factor, wherein the input signal includes an in-phase portion and a quadrature portion;
  outputting, via a phase rotating portion, a phase-rotated in-phase signal and a phase-rotated quadrature signal, the phase-rotated in-phase signal being based on the in-phase portion, the phase-rotated quadrature signal being based on the quadrature portion;
  outputting, via a phase compensating portion, one of an adjusted in-phase signal and an adjusted quadrature signal, the adjusted in-phase signal being based on the phase-rotated in-phase signal, the adjusted quadrature signal being based on the phase-adjusted quadrature signal; and
  outputting, via a delay portion, a delay signal to the gain adjustment portion based on the input signal,
wherein the first gain factor is based on the first gain adjustment signal,
wherein the second gain factor is based on the second gain adjustment signal,
wherein the first gain factor is the same as the second gain factor,
wherein said gain adjustment portion is operable to output the first gain adjustment signal as a first in-phase gain adjustment signal based on the first packet and a first quadrature gain adjustment signal based on the first packet,
wherein said gain adjustment portion is operable to output the second gain adjustment signal as a second in-phase gain adjustment signal based on the second packet and a second quadrature gain adjustment signal based on the second packet,
wherein said gain portion is operable to output the first signal as an in-phase signal corresponding to the first packet and a quadrature signal corresponding to the first packet,
wherein said gain portion is operable to output the second signal as an in-phase signal corresponding to the second packet and a quadrature signal corresponding to the second packet,
wherein the first gain factor includes a first in-phase gain factor and a first quadrature gain factor, the first in-phase gain factor being based on the first in-phase gain adjustment signal, the first quadrature gain factor being based on the first quadrature gain adjustment signal,
wherein the second gain factor includes a second in-phase gain factor and a second quadrature gain factor, the second in-phase gain factor being based on the second in-phase gain adjustment signal, the second quadrature gain factor being based on the second quadrature gain adjustment signal,
wherein the in-phase signal corresponding to the first packet is based on the in-phase portion and the first in-phase gain factor,
wherein the quadrature signal corresponding to the first packet is based on the quadrature portion and the first quadrature gain factor,
wherein the in-phase signal corresponding to the second packet is based on the in-phase portion and the second in-phase gain factor,
wherein the quadrature signal corresponding to the second packet is based on the quadrature portion and the second quadrature gain factor,
wherein the first in-phase gain factor is based on the first in-phase gain adjustment signal,
wherein the first quadrature gain factor is based on the first quadrature gain adjustment signal,
wherein the second in-phase gain factor is based on the second in-phase gain adjustment signal, and
wherein the second quadrature gain factor is based on the second quadrature gain adjustment signal,
wherein said outputting the first gain adjustment signal and the second gain adjustment signal comprises outputting the first gain adjustment signal and the second gain adjustment signal based on the delay signal,
wherein said outputting the third gain adjustment signal and the fourth gain adjustment signal comprises outputting the third gain adjustment signal and the fourth gain adjustment signal based on the delay signal,
wherein said outputting the in-phase signal corresponding to the first packet comprises outputting the in-phase signal corresponding to the first packet based on one of the adjusted in-phase signal and the phase-rotated in-phase signal,
wherein said outputting the quadrature signal corresponding to the first packet comprises outputting the quadrature signal corresponding to the first packet based on the other of phase-rotated quadrature signal and adjusted quadrature portion, wherein said outputting the in-phase signal corresponding to the second packet comprises outputting the in-phase signal corresponding to the second packet based on the one of adjusted in-phase signal and phase-rotated in-phase signal, and wherein said outputting the quadrature signal corresponding to the second packet comprises outputting the quadrature signal corresponding to the second packet based on the other of phase-rotated quadrature signal and adjusted quadrature portion.

* * * * *